US008788190B2

(12) United States Patent
Funabashi

(10) Patent No.: US 8,788,190 B2
(45) Date of Patent: Jul. 22, 2014

(54) ON-VEHICLE WIRELESS COMMUNICATION APPARATUS AND COMMUNICATION SYSTEM THEREOF

(75) Inventor: Junichirou Funabashi, Nagoya (JP)

(73) Assignee: Denso Corporation, Kariya (JP)

( * ) Notice: Subject to any disclaimer, the term of this patent is extended or adjusted under 35 U.S.C. 154(b) by 99 days.

(21) Appl. No.: 13/489,906

(22) Filed: Jun. 6, 2012

(65) Prior Publication Data
US 2012/0323476 A1 Dec. 20, 2012

(30) Foreign Application Priority Data
Jun. 15, 2011 (JP) .................................. 2011-133583

(51) Int. Cl.
G06F 17/00 (2006.01)
G01S 7/285 (2006.01)
G08G 1/01 (2006.01)
G08G 1/0967 (2006.01)
G01S 7/282 (2006.01)

(52) U.S. Cl.
CPC .............. G08G 1/0112 (2013.01); G01S 7/285 (2013.01); G08G 1/0967 (2013.01); G01S 7/282 (2013.01)
USPC ................................ 701/300; 342/82; 342/89

(58) Field of Classification Search
CPC .......... H04B 7/2693; H04B 7/00; G08G 1/00; G08G 1/0112; G08G 1/0967; G01S 7/282; G01S 7/285
USPC ........... 455/502, 130; 340/902; 701/300, 301, 701/302; 342/82, 89, 98
See application file for complete search history.

(56) References Cited

U.S. PATENT DOCUMENTS

| 5,977,913 | A | * | 11/1999 | Christ | 342/465 |
| 6,016,322 | A | * | 1/2000 | Goldman | 370/508 |
| 6,114,992 | A | * | 9/2000 | Underbrink | 342/357.67 |
| 6,684,158 | B1 | * | 1/2004 | Garin et al. | 701/470 |
| 6,907,224 | B2 | * | 6/2005 | Younis | 455/12.1 |
| 7,042,909 | B2 | * | 5/2006 | Schaller | 370/503 |
| 8,004,454 | B2 | * | 8/2011 | Lindoff et al. | 342/134 |

(Continued)

FOREIGN PATENT DOCUMENTS

| JP | 2000-348300 | 12/2000 |
| JP | 2001-67589 | 3/2001 |

(Continued)

OTHER PUBLICATIONS

Office action dated Apr. 1, 2014 in corresponding Japanese Application No. 2011-133583.

Primary Examiner — Tuan C. To
(74) Attorney, Agent, or Firm — Harness, Dickey & Pierce, PLC

(57) ABSTRACT

An on-vehicle wireless communication apparatus for transmitting transmission data having positional information wirelessly at a frequency includes: a receiver receiving the transmission data from another apparatus; a positional information acquiring unit acquiring the positional information; a location specifying unit specifying a location relationship between a vehicle and another vehicle based on the positional information of the vehicle and the another vehicle; an another-apparatus transmission timing specifying unit specifying a transmission timing of the another apparatus when the another vehicle is located immediately in front of the vehicle; and a transmission timing adjusting unit adjusting a transmission timing of the apparatus so that the transmission data is transmitted at the frequency with an adjusted transmission timing, which is later by a predetermined time than the transmission timing of the another apparatus.

15 Claims, 7 Drawing Sheets

(56) References Cited

U.S. PATENT DOCUMENTS

| | | | |
|---|---|---|---|
| 8,068,984 B2 * | 11/2011 | Smith et al. | 701/472 |
| 8,099,232 B2 * | 1/2012 | Tanaka et al. | 701/117 |
| 8,406,795 B2 * | 3/2013 | Lane et al. | 455/502 |
| 8,483,731 B2 * | 7/2013 | Gormley | 455/502 |
| 2007/0117525 A1 | 5/2007 | Osafune | |
| 2009/0017851 A1 * | 1/2009 | Li et al. | 455/502 |
| 2009/0316816 A1 * | 12/2009 | Geile et al. | 375/260 |
| 2010/0103980 A1 * | 4/2010 | Smith et al. | 375/131 |
| 2010/0142365 A1 * | 6/2010 | Richardson et al. | 370/210 |
| 2010/0171659 A1 * | 7/2010 | Waters et al. | 342/357.12 |
| 2011/0171970 A1 * | 7/2011 | Ishikawa | 455/456.1 |
| 2011/0183605 A1 * | 7/2011 | Smith et al. | 455/7 |

FOREIGN PATENT DOCUMENTS

| | | |
|---|---|---|
| JP | 2006-20116 | 1/2006 |
| JP | 2009-159297 | 7/2009 |
| JP | 2009-278536 | 11/2009 |
| JP | 2010-87701 | 4/2010 |
| JP | 2010-118731 | 5/2010 |

* cited by examiner

ON-VEHICLE WIRELESS COMMUNICATION APPARATUS AND COMMUNICATION SYSTEM THEREOF

CROSS REFERENCE TO RELATED APPLICATION

This application is based on Japanese Patent Application No. 2011-133583 filed on Jun. 15, 2011, the disclosure of which is incorporated herein by reference.

TECHNICAL FIELD

The present disclosure relates to an on-vehicle wireless communication apparatus and a communication system including the on-vehicle wireless communication apparatus.

BACKGROUND

A wireless communication system using a protocol called "CSMA/CA (carrier sense multiple access/collision avoidance) system has been known as a unit for realizing a wireless communication between vehicles without using a base station. In the CSMA/CA system, each communication apparatus confirms that a communication channel is continuously free for a given time or longer, postpones data transmission if there is no free communication channel, and thereafter transmits data, thereby avoiding a collision between data transmitted from each communication apparatus.

Also, as disposed in Patent Document 1, the application of the CSMA/CA system for an inter-vehicle communication has been known. In particular, a technique has been known in which information is shared between the vehicles by conducting a one-way broadcast communication without ACK (acknowledgement) as the inter-vehicle communication of the CSMA/CA system.

Patent Document 1: JP-A-2009-278536

In the inter-vehicle communication, because each vehicle travels, it is important to ensure a real-time property of the data communication.

However, in the inter-vehicle communication, because each vehicle periodically starts transmission at an arbitrary timing, it is conceivable that transmission is frequently postponed if the number of peripheral vehicles increases. For that reason, the inter-vehicle communication in which information on vehicle states are transmitted and received among the respective vehicles suffers from such a problem that a detection of a change in a state of another vehicle is delayed.

SUMMARY

It is an object of the present disclosure to provide an on-vehicle wireless communication apparatus and a communication system which provide improvements of the real-time property of the data communication in the inter-vehicle communication.

According to an aspect of the present disclosure, an on-vehicle wireless communication apparatus mounted on a vehicle for transmitting transmission data wirelessly at a predetermined frequency, the transmission data including at least positional information of the vehicle, the apparatus includes: a receiver that sequentially receives the transmission data transmitted from another on-vehicle wireless communication apparatus mounted on another vehicle; a positional information acquiring unit that sequentially acquires the positional information of the vehicle; a location specifying unit that specifies a location relationship between the vehicle and the another vehicle based on the positional information of the vehicle acquired by the positional information acquiring unit and the positional information of the another vehicle received by the receiver; an another-apparatus transmission timing specifying unit that specifies a transmission timing of the transmission data in the another on-vehicle wireless communication apparatus when the another vehicle is located immediately in front of the vehicle; and a transmission timing adjusting unit that adjusts a transmission timing of the transmission data to be transmitted from the on-vehicle wireless communication apparatus so that the transmission data is transmitted at the predetermined frequency with an adjusted transmission timing of the on-vehicle wireless communication apparatus, which is later by a predetermined time than the transmission timing of the another on-vehicle wireless communication apparatus.

In the above apparatus, when the vehicles each having the on-vehicle wireless communication apparatus mounted therein are lined up, the transmission timing is adjusted in each on-vehicle wireless communication apparatus so that the transmission timing is shifted by the predetermined times according to locations of the vehicles. Also, since the transmission timing of each on-vehicle wireless communication apparatus is so adjusted as to be shifted by the predetermined times, the transmission data of each on-vehicle wireless communication apparatus does not collide with each other, thereby making it hard to damage the real time property of the data communication. Therefore, the apparatus can make it hard to damage the real time property of the data communication in the inter-vehicle communication.

According to another aspect of the present disclosure, a communication system includes a plurality of on-vehicle wireless communication apparatuses. Each on-vehicle wireless communication apparatus is defined according to the aspect of the present disclosure. Each on-vehicle wireless communication apparatus is mounted on a respective vehicle.

The above communication system includes one of the respective on-vehicle wireless communication apparatuses mounted in a plurality of vehicles, thereby being capable of making it hard to damage the real time property of the data communication.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
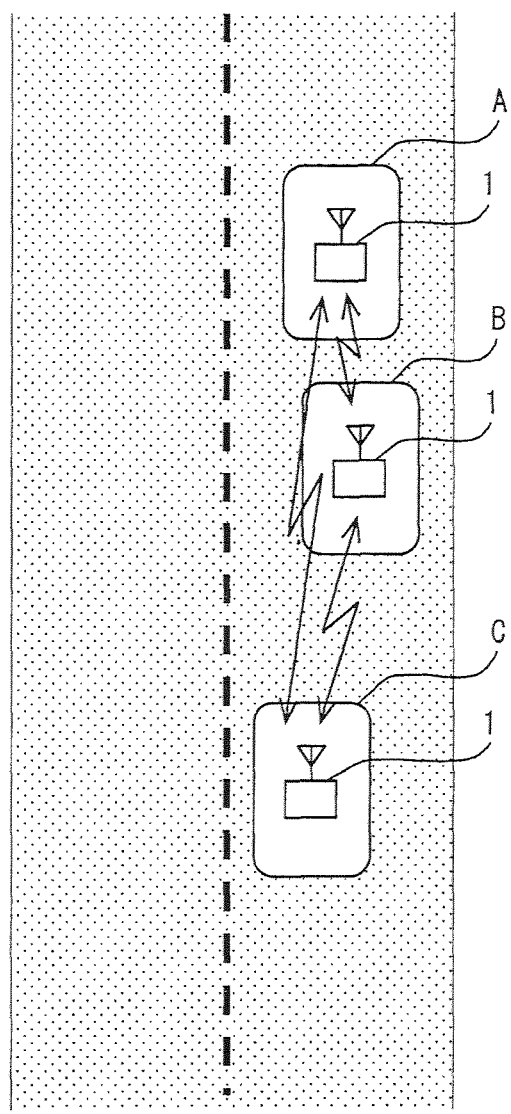
FIG. 1 is a diagram schematically illustrating a configuration of a communication system.

Hereinafter, embodiments of the present disclosure will be described with reference to the accompanying drawings. FIG. 1 is a block diagram illustrating a schematic configuration of a communication system 100 according to the present disclosure. The communication system 100 illustrated in FIG. 1 includes three on-vehicle wireless communication apparatuses 1 mounted in a plurality of vehicles (vehicle A, vehicle B, vehicle C) one by one.

The on-vehicle wireless communication apparatus 1 is mounted in a vehicle such as an automobile, and in this embodiment, mounted in each of vehicles A to C as automobiles. FIG. 1 illustrates the configuration including those three on-vehicle wireless communication apparatuses 1 in the communication system 100. However, the present disclosure is not always limited to this configuration. If a plurality of the on-vehicle wireless communication apparatuses 1 mounted in the respective vehicles is included in the communication system 100, the on-vehicle wireless communication apparatuses 1 of the number other than three may be included in the communication system 100. However, in the following description, for convenience, it is assumed that the communication system 100 includes those three on-vehicle wireless communication apparatuses 1 mounted in the respective vehicles A to C.

Figure 2:
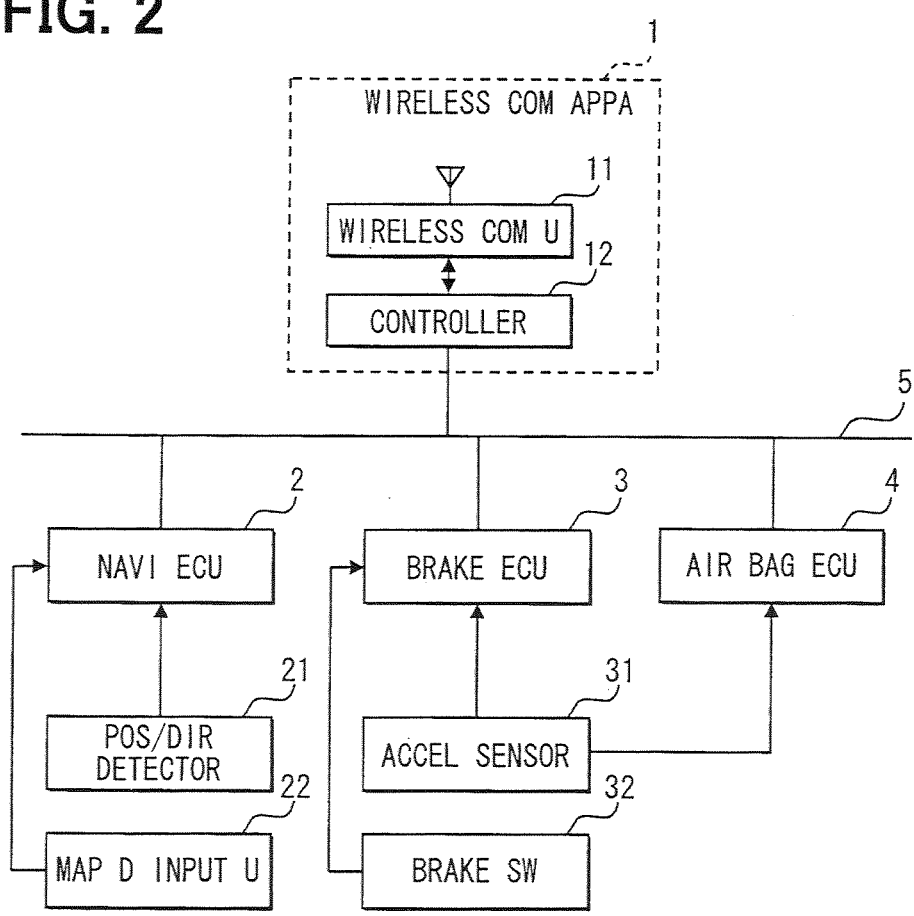
FIG. 2 is a block diagram schematically illustrating a configuration of an on-vehicle wireless communication apparatus.

Now, a description will be given of a schematic configuration of the on-vehicle wireless communication apparatuses 1 with reference to FIG. 2. FIG. 2 is a block diagram schematically illustrating a configuration of the on-vehicle wireless communication apparatuses 1. As illustrated in FIG. 2, each of the on-vehicle wireless communication apparatuses 1 includes a wireless communication unit 11 and a controller 12. Also, each of the on-vehicle wireless communication apparatuses 1 is connected to a navigation ECU 2, a brake ECU 3, and an air bag ECU 4 so as to communicate electronic information therewith. The on-vehicle wireless communication apparatus 1, the navigation ECU 2, the brake ECU 3, and the air bag ECU 4 are connected to each other by an in-vehicle LAN 5 conforming to a communication protocol such as a control area network (CAN).

The navigation ECU 2 is a control device for an in-vehicle navigation device, and mainly configured by a known microcomputer formed of a CPU, a ROM, a RAM, and a backup RAM. The navigation ECU 2 executes a variety of processing as navigation functions on the basis of a current position and a travel direction of a vehicle, which are detected by a position direction detector 21 that will be described later, and map data read from a map data input unit 22 that will be described later.

The position direction detector 21 sequentially detects the current position and the travel direction of the vehicle on the basis of information obtained from respective sensors such as a geomagnetic sensor that detects a terrestrial magnetism, a gyroscope that detects an angular velocity about a vertical direction of the subject vehicle, a distance sensor that detects a travel distance of the subject vehicle, and a global positioning system (GPS) receiver for a GPS that detects the current position of the vehicle on the basis of radio waves from a satellite. Those respective sensors have errors different in property, and therefore are used while supplementing the errors by the plural sensors. The position direction detector 21 may be configured by a part of the above-mentioned sensors depending on precisions of the respective sensors, or may be configured by another sensor other than the above-mentioned sensor.

Also, the current position may be represented by lat/long. Also, the travel direction may be represented as an azimuth angle with reference to north, or may be represented as a link direction that will be described later. This embodiment will be described below assuming that the current position is represented as lat/log, and the travel direction is represented as the azimuth angle with reference to north.

The map data input unit 22 is a device that is equipped with a storage medium (not shown) for inputting map data stored in the storage medium. The map data includes link data and node data representative of roads. The link data includes various data such as specific numbers (link IDs) specifying links, link lengths indicative of lengths of the links, the link directions, link azimuths, start and end node coordinates (lat/log) of the links, road names, road types, one-way attributes, road widths, the numbers of roads, the presence of right-turn lanes and left-turn lanes, the numbers of those turn lanes, and speed limit values. On the other hand, the node data includes various data such as node IDs having specific numbers for respective nodes where the respective roads on the map cross, merge, and branch, node coordinates, node names, connection link IDs describing the link IDs of the links connected to the nodes, and intersection types.

The map data is not limited to the map data stored in the storage medium loaded in the map data input unit 22, but may be map data used through a server communication unit not shown.

The brake ECU 3 is mainly configured by a microcomputer formed of a CPU, a ROM, a RAM, and a backup RAM. The brake ECU 3 executes a variety of processing related to braking of the subject vehicle with the execution of various control programs stored in the ROM on the basis of a signal input from, for example, an acceleration sensor 31 or a brake switch 32.

The acceleration sensor 31 detects an acceleration of the vehicle. In this embodiment, the acceleration sensor 31 is a biaxial acceleration sensor that detects accelerations in a vehicle width direction (x-axis) and a vehicle longitudinal direction (y-axis). The brake switch 32 is kept on while a brake pedal of the vehicle is pressed.

The air bag ECU 4 determines whether a frontal collision or a lateral collision of the vehicle occurs, or not, on the basis of the signal output from the acceleration sensor 31, and outputs an ignition signal to an air bag module when detecting the frontal collision or the lateral collision. In the present specification, the air back module is identical with known air bag modules which instantaneously generate an inflation medium gas by an inflator upon receiving the ignition signal from the air bag ECU 4 to develop an air bag.

The wireless communication unit 11 of the on-vehicle wireless communication apparatus 1 includes a transmitter/receiver antenna, and delivers information on the subject vehicle and receives (that is, communicates between the vehicles) information on the other vehicles (hereinafter referred to as "partner vehicles") located around the subject vehicle position with the partner vehicles by a wireless communication not through a telephone network. In the wireless communication using radio waves of, for example, 700 MHz band, the wireless communication unit 11 conducts an inter-vehicle communication with the partner vehicles located within, for example, an about 1 km radius from the subject vehicle position. In the wireless communication using radio waves of, for example, 5.9 GHz band, the wireless communication unit 11 conducts the inter-vehicle communication with the partner vehicles located within, for example, an about 800 m radius from the subject vehicle position. The wireless communication unit 11 corresponds to a receiver. For example, the wireless communication unit 11 conducts the inter-vehicle communication by one-way broadcast communication without acknowledgement (ACK) of a CSMA/CA system using the radio waves of 700 MHz band. The wireless communication unit 11 transmits data in a given transmission period (hereinafter referred to as "transmission data") according to an instruction from the controller 12. In this embodiment, it is assumed that the transmission period is 100 msec.

The controller 12 of the on-vehicle wireless communication apparatus 1 is configured by a normal computer, and internally includes a known CPU, memories such as a ROM, a RAM, and an EEPROM, an I/O, and a bus line connecting those components (all not shown). The controller 12 executes a variety of processing on the basis of a variety of information input from the wireless communication unit 11, the navigation ECU 2, the brake ECU 3, and the air bag ECU 4.

For example, the controller 12 allows the transmission data to be transmitted from the wireless communication unit 11 in the transmission period of 100 msec as described above. Also, the transmission data includes, for example, information on the current position and the travel direction of the vehicle, information related to a change in the behavior of the vehicle such as braking, and information related to the actuation of a safety device such as an air bag.

The controller 12 acquires the information on the current position and the travel direction of the vehicle from the navigation ECU 2 that receives the information on the current position and the travel direction which are sequentially detected by the position direction detector 21. Hence, the controller 12 corresponds to a positional information acquiring unit and a travel direction information acquiring unit. The controller 12 may be configured to acquire the information on the current position and the travel direction of the vehicle from the position direction detector 21.

Also, as the information (hereinafter referred to as "vehicle state information") related to the change in the behavior of the vehicle such as braking, information on longitudinal acceleration and a signal of an on-state of the brake switch 32 are obtained from the brake ECU 3 that receives signals of the acceleration sensor 31 and the brake switch 32. In this embodiment, a case using information related to braking such as the longitudinal acceleration detected by the acceleration sensor 31 and the signal of the on-state of the brake switch 32 as the vehicle state information will be exemplified. However, the present disclosure is not always limited to this configuration. Other information may be used as the vehicle state information if the information is related to the behavior that affects the travel of vehicles around the subject vehicle. For example, information on a brake fluid pressure detected by the brake pressure sensor may be used as the information related to braking. Also, information on a steering angle of a steering which is detected by a steering angle sensor or a lateral acceleration detected by the acceleration sensor 31 may be used as the information on the behavior other than braking.

Further, as the information (hereinafter referred to as "safety device actuation information") related to the actuation of the safety device, the above-mentioned ignition signal from the air bag ECU 4 is obtained. In this embodiment, a case using the ignition signal from the air bag ECU will be exemplified as the safety device actuation information. However, the present disclosure is not limited to this configuration. For example, a signal output at the time of actuating a lock mechanism of a seat belt may be used. Also, a signal output at the time of actuating not only a collision safety device for so-called passive safety which is a device actuated upon detecting that the subject vehicle comes into contact with the obstacle, but also a device for active safety such as a precrash safety system which is actuated upon detecting a dangerousness that the subject vehicle comes into contact with the obstacle may be used.

The controller 12 always transmits the transmission data to be transmitted in the transmission period of 100 msec with the inclusion of the information (hereinafter referred to as "positional information") on the current position of the vehicle and the information (hereinafter referred to as "travel direction information") on the travel direction of the vehicle among the above variety of information. On the other hand, when the controller 12 acquires the vehicle state information and the safety device actuation information as the important information that affects the travel of the vehicle around the subject vehicle, the controller 12 transmits the transmission data to be thereafter transmitted with the inclusion of the acquired vehicle state information and safety device actuation information. Hence, the controller 12 corresponds to the important information acquiring unit.

The important information may include information to be transmitted upon receiving transmission operation from a passenger as a trigger, or information to be transmitted with information obtained by an in-vehicle communication unit (cellular phone, etc.) as a trigger. The information to be transmitted is exemplified by the abnormality of a road (clog, mudslide, flood, existence of a crashed vehicle, etc.) and the abnormality of a driver (doze, attack, crime victim, etc.). Also, the important information may include information to be transmitted with information obtained by a sensor such as a driver monitor device not shown for detecting the abnormality of the driver per se such as doze, attack, or crime victim as a trigger. In this case, the information to be transmitted is exemplified by the abnormality of the driver per se (doze, attach, crime victim, etc.).

Also, when transmitting the transmission data with the inclusion of the important information acquired by the subject vehicle, the controller 12 adds transfer stop condition information which will be described later, and source information indicating that the subject vehicle is a transmission source to the important information, and transmits those information. The vehicle ID may be used as the source information, but in this embodiment, the important information is transmitted with the addition of the positional information on the subject vehicle as the source information from the viewpoint of security. The details of the transfer stop condition information will be described later.

The controller 12 may transmit the transmission data with the inclusion of information (hereinafter referred to as "other information") other than the positional information, the travel direction information, and the important information. It is assumed that the important information is sufficiently smaller in the amount of information than the other information.

When receiving the transmission data including the important information from the on-vehicle wireless communication apparatus 1 of the other vehicle, the controller 12 conducts control according to the important information. For example, when receiving the important information, the controller 12 reduces a speed of the subject vehicle, forcedly stops the subject vehicle, or conducts brake assist for raising the brake fluid pressure.

Figure 3:
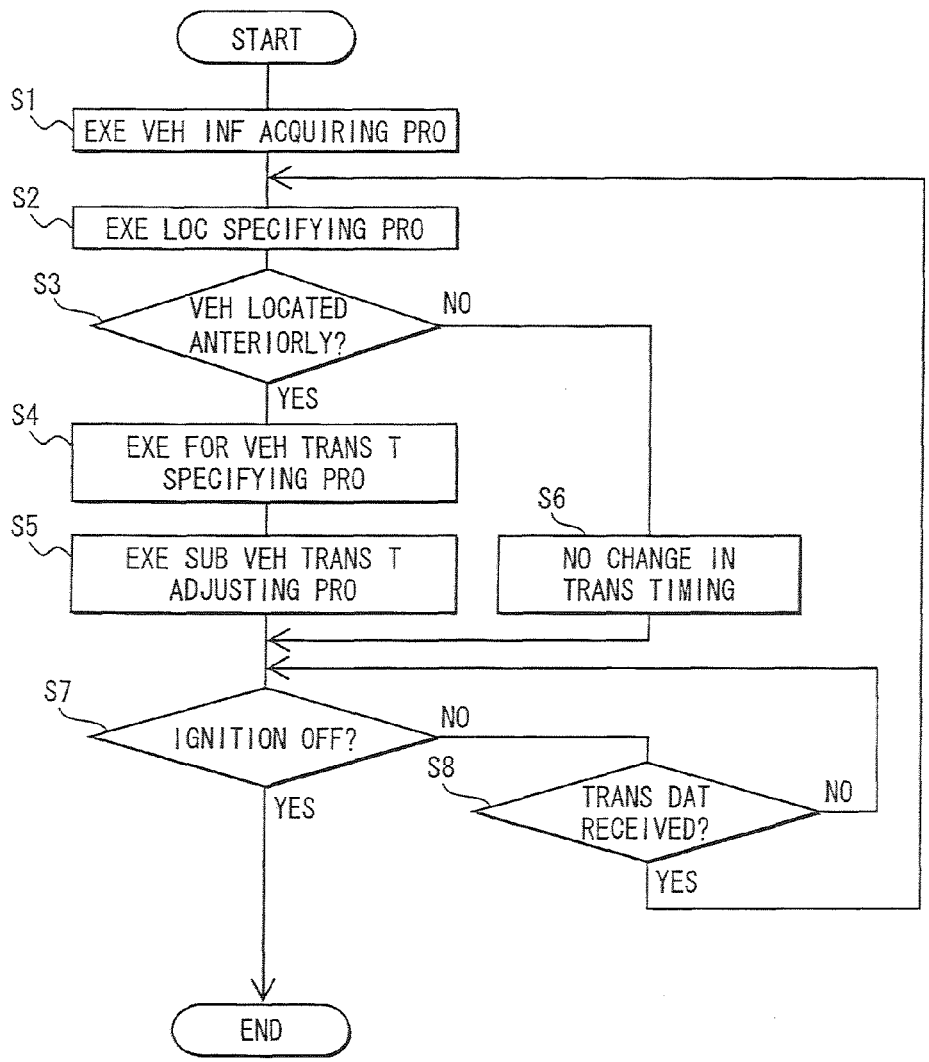
FIG. 3 is a flowchart illustrating a flow of transmission timing adjustment related processing in a controller of the on-vehicle wireless communication apparatus.

Also, the controller 12 adjusts the transmission timing of the transmission data on the basis of a relative positional relationship of the other vehicles located within a communication range of the inter-vehicle communication and the subject vehicle. The controller 12 adjusts the transmission timing of the transmission data, but does not change the transmission period. In this example, a description will be given of processing (hereinafter referred to as "transmission timing adjustment related processing) related to adjustment of the transmission timing in the controller 12 with reference to FIG. 3. FIG. 3 is a flowchart illustrating a flow of transmission timing adjustment related processing in the controller 12 of the on-vehicle wireless communication apparatus 1. This flow starts, for example, when an ignition power supply of the subject vehicle turns on, and a power supply of the on-vehicle wireless communication apparatus 1 turns on.

First, in Step S1, the other vehicle information acquiring process is conducted, and the processing is shifted to Step S2. In the other vehicle information acquiring process, when the transmission data is received by the wireless communication unit 11 from the on-vehicle wireless communication apparatus 1 mounted in the other vehicle, the following processing is conducted. In detail, the positional information and the travel direction information included in the transmission data received from the other vehicle, the information on the timing when receiving the transmission data, and the positional information and the travel direction information on the subject vehicle are stored in association with each other in an electrically rewritable memory such as a RAM.

The timing when receiving the transmission data may be measured by a timer circuit not shown in the controller 12. Also, the positional information and the travel direction information on the subject and other vehicles having substantially the same detection time of the current position and the travel direction may be stored in association with each other in the memory. In this case, a GPS time when detecting the current position and the travel direction may be measured by the GPS receiver, and information on the GPS time may be added to the positional information and the travel direction information and transmitted. The positional information and the travel direction information on the subject and other vehicles having substantially the same detection time of the current position and the travel direction may be associated with each other on the basis of the GPS time. Also, the positional information and the travel direction information on the subject and other vehicles, which are obtained when receiving the transmission data, may be stored in association with each other in the memory.

In the other vehicle information acquiring process, the processing is shifted to Step S2 when receiving the transmission data once. However, in this embodiment, the transmission data received within a given time is associated with each other as described above, and stored in the memory. Also, in this embodiment, tracks of the other vehicles are obtained on the basis of the positional information and the travel direction information on the other vehicles included in the transmission data received within the given time to make the individual other vehicles discriminable, thereby specifying the individual other vehicles. The information associated with each other for each of the specified other vehicles as described above is, for example, listed and held. In the following description, the list is called "other-vehicle information list".

When the transmission data is also transmitted with the inclusion of identification information (for example, vehicle IDs) for specifying the vehicles, the individual other vehicles may be specified by using the vehicle IDs. However, in this embodiment, the individual other vehicles are specified according to the temporal relative positional relationship with the subject vehicle from the viewpoint of security.

In Step S2, the location specifying process is conducted, and the processing is shifted to Step S3. In the location specifying process, the relative positional relationship of the subject vehicle and the other vehicles is obtained on the basis of the positional information on the other vehicles included in the other-vehicle information list, and the positional information on the subject vehicle corresponding to the positional information on the other vehicles. The relative positional relationship of the subject vehicle and the other vehicles is roughly obtained by obtaining the track of the subject vehicle and the tracks of the other vehicles on the basis of, for example, the positional information and the travel direction information on the other vehicles included in the other-vehicle information list, and the positional information and the travel direction information on the subject vehicle corresponding to those information on the other vehicles, and comparing those tracks with each other.

In addition, when the positional information and the travel direction information on the subject and other vehicles having substantially the same detection time of the current position and the travel direction are associated with each other in the other-vehicle information list, the relative positional relationship of the subject vehicle and the other vehicles at substantially the same time is obtained on the basis of those positional information. Also, when the positional information and the travel direction information included in the transmission data received from the other vehicle are associated with the positional information and the travel direction information on the subject vehicle, which are obtained when receiving the transmission data, in the other-vehicle information list, the following processing is conducted. In detail, distances between the subject vehicle and the other vehicles are calculated according to the positional information on the subject vehicle and the positional information on the other vehicles. Also, a propagation time of the transmission data is calculated on the basis of the calculated distances, and any one of the positional information on the subject vehicle and the positional information on the other vehicles is corrected taking time differences of the propagation times into account to obtain the relative positional relationship of the subject vehicle and the other vehicles at substantially the same time.

Subsequently, the locations of the subject vehicle and the other vehicles having the same travel direction as that of the subject vehicle in the travel direction (alignment sequence in the travel direction, that is, alignment sequence from a head side in the travel direction) are specified on the basis of the travel direction information on the other vehicles included in the other-vehicle information list, and the travel direction information on the subject vehicle corresponding to the travel direction information on the other vehicles. Hence, the controller 12 corresponds to a location specifying unit. In the present specification, the same travel direction represents that the travel directions (two kinds of forward and reverse travel directions) on a road, which are obtained according to the travel direction information and the map data, are identical with each other. Also, the alignment sequence in the travel direction includes the vehicles on another lane in the same travel direction.

In Step S3, if the other vehicle is located in front of the subject vehicle in the alignment sequence specified by the location specifying process (yes in Step S3), the processing is shifted to Step S4. Also, if no other vehicle is located in front of the subject vehicle in the alignment sequence specified by the location specifying process (no in Step S3), the processing is shifted to Step S6.

In Step S4, a forward vehicle transmission timing specifying process is conducted, and the processing is shifted to Step S5. In the forward vehicle transmission timing specifying process, the transmission timing of the transmission data from the on-vehicle wireless communication apparatus 1 mounted in the other vehicle immediately in front of the subject vehicle in the same travel direction is specified in the in the alignment sequence specified by the location specifying process. Hence, the controller 12 corresponds to the other-apparatus transmission timing specifying unit.

In more detail, the transmission timing of the transmission data is specified on the basis of the information on the timing when receiving the transmission timing, which is included in the other-vehicle information list of the other vehicles. That is, the transmission timing of the transmission data in the on-vehicle wireless communication apparatus 1 is specified on the basis of the timing when the wireless communication unit 11 receives the transmission data from the on-vehicle wireless communication apparatus 1 mounted in the other vehicle immediately in front of the subject vehicle in the same travel direction.

For example, the distance between the subject vehicle and the other vehicle is calculated according to the positional information on the subject vehicle and the positional information on the other vehicle, and the propagation time of the transmission data is calculated on the basis of the calculated distance. Then, a transmission time of the transmission data of the other vehicle is obtained according to the propagation time and the timing when receiving the transmission data, and the transmission timing is specified every 100 msec from the transmission time thus obtained.

Also, when the transmission data is transmitted with the inclusion of the information on the transmission time of the transmission data, the transmission timing is specified by the aid of the information on the transmission time. In this case, information on a GPS time measured by the GPS receiver is used as the information on the transmission time.

In Step S5, a subject vehicle transmission timing adjusting process is conducted, and the processing is shifted to Step S7. In the subject vehicle transmission timing adjusting process, the transmission timing of the transmission data from the wireless communication unit 11 is adjusted so that the transmission data is transmitted every given period (100 msec in this embodiment) at the timing of a given time after the transmission timing specified in the forward vehicle transmission timing specifying process. Hence, the controller 12 corresponds to the transmission timing adjusting unit. In the present specification, the given time can be arbitrarily set if the time is sufficiently shorter than the transmission period, and allows leeway necessary for effectively braking the subject vehicle or controlling avoidance according to the transmission data (for example, important information) of the forward vehicle closest to the subject vehicle. For example, the given time is set to 10 msec. In this embodiment, multiples of the given time coincide with the transmission period. However, it is preferable that the multiples of the given time are so set as not to coincide with the transmission period so that the transmission data of the on-vehicle wireless communication apparatus 1 in each vehicle cannot be transmitted at the same timing.

In the subject vehicle transmission timing adjusting process, the transmission timing of the transmission data from the wireless communication unit 11 is adjusted while temporarily changing the transmission period of the transmission data so that the transmission timing gradually comes closer to timing of the given time after the transmission timing specified in the forward vehicle transmission timing specifying process. In more detail, the transmission period every time the transmission data is transmitted once is changed from a normal transmission period (100 msec in this example) so that the transmission timing comes closer to an intended transmission timing bit by bit through plural times of transmission of the transmission data.

Also, when a lower limit of the transmission period at the time of changing the transmission period is defined, the transmission timing is adjusted while changing the transmission period without falling below the lower limit. For example, if the lower limit of the normal transmission period 100 msec is defined as 90 msec, and there is a need to quicken the transmission timing by 40 msec, the transmission of the transmission data with the transmission period changed to 90 msec is conducted four times to quicken the transmission time by 40 msec.

Likewise, when an upper limit of the transmission period at the time of changing the transmission period is defined (for example, the lower limit of the normal transmission period 100 msec is 110 msec), the transmission timing is adjusted. When no upper limit of the transmission period at the time of changing the transmission period is defined, the transmission period may be remarkably lengthened so that the transmission timing is adjusted to a given time after the transmission timing specified in the forward vehicle transmission timing specifying process by only one transmission of the transmission data.

In addition, when the transmission timing is adjusted to the given time after the transmission timing specified in the forward vehicle transmission timing specifying process by only one transmission of the transmission data, the transmission timing may be adjusted by one transmission of the transmission data without gradually adjusting the transmission timing.

Hereinafter, a description will be given of this embodiment in which the lower limit of the transmission period at the time of changing the transmission period is defined, and the transmission timing is gradually adjusted while changing the transmission period without falling below the lower limit.

In Step S6 subsequent to Step S3, the processing is shifted to Step S7 without changing the transmission timing of the transmission data from the wireless communication unit 11. In Step S7, if the ignition power supply of the subject vehicle turns off (yes in Step S7), the flow is completed. Also, if the ignition power supply of the subject vehicle does not turn off (no in Step S7), the processing is shifted to Step S8.

In Step S8, if the wireless communication unit 11 receives new transmission data from the on-vehicle wireless communication apparatus 1 mounted in the other vehicle (yes in Step S8), the positional information and the travel direction information included in the transmission data, the information on the timing when receiving the transmission data, and the positional information and the travel direction information on the subject vehicle, which are obtained when receiving the transmission data, are added to the other-vehicle information list in association with each other. Then, the processing is returned to Step S2, and the flow is repeated. Also, if the wireless communication unit 11 receives no new transmission data from the on-vehicle wireless communication apparatus 1 mounted in the other vehicle (no in Step S8), the processing is returned to Step S7, and the processing is repeated.

The information in the other-vehicle information list may be erased from an old piece of information if the information reaches a given capacity or more, or may be erased with the elapse of a given time or longer after the information has been stored in the memory.

According to the above configuration, the transmission timing is adjusted by the on-vehicle wireless communication apparatus 1 of each vehicle so that the transmission timing is shifted by the given time according to the alignment sequence of the respective vehicles having the same travel direction in the travel direction. Also, when the lower limit of the transmission period at the time of changing the transmission period of the transmission data is defined, the transmission timing of the transmission data from the subject vehicle is gradually adjusted while changing the transmission period without falling below the lower limit. This makes it possible to adjust the transmission timing without rapidly changing the transmission period of the transmission data following the definition of the lower limit.

Figure 4:
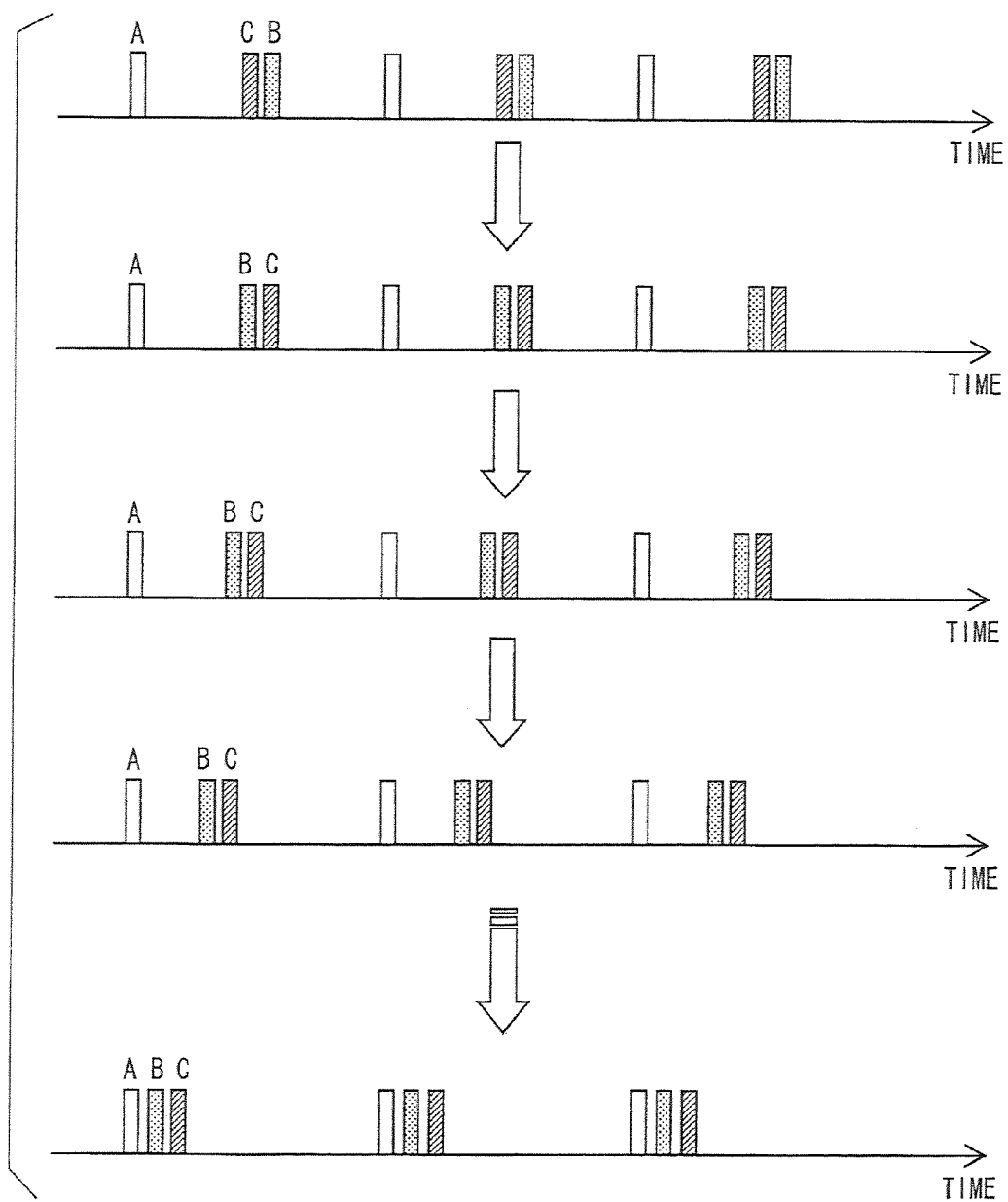
FIG. 4 is a schematic diagram illustrating a change in transmission timing of the on-vehicle wireless communication apparatuses in vehicles A to C.

The vehicles A to C in FIG. 1 are exemplified in the following description with reference to FIG. 4. FIG. 4 is a schematic diagram illustrating a change in the transmission timing of the on-vehicle wireless communication apparatuses 1 in the vehicles A to C. In this example, the transmission timings of the on-vehicle wireless communication apparatuses 1 of the vehicles A to C are arranged in the stated order of the vehicle A, the vehicle C, and the vehicle B. It is assumed that the transmission timing of the vehicle C is delayed from the transmission timing of the vehicle A by 36 msec, and the transmission timing of the vehicle B is delayed from the transmission timing of the vehicle A by 36 msec. Also, in the description, it is assumed that no vehicle is located in front of the vehicle A and at the rear of the vehicle C within the communication range of the inter-vehicle communication.

In the on-vehicle wireless communication apparatus 1 of the vehicle A, the alignment sequence is specified as the stated order of the vehicle A, the vehicle B, and the vehicle C in the location specifying process, on the basis of the transmission data received from the on-vehicle wireless communication apparatuses 1 of the vehicles B and C. Since no other vehicle is located in front of the vehicle A in the specified location, the transmission timing of the on-vehicle wireless communication apparatus 1 in the vehicle A is not changed.

Also, in the on-vehicle wireless communication apparatus 1 of the vehicle B, the alignment sequence is specified as the stated order of the vehicle A, the vehicle B, and the vehicle C in the location specifying process, on the basis of the transmission data received from the on-vehicle wireless communication apparatuses 1 of the vehicles A and C. Since the vehicle A having the same travel direction is located immediately in front of the vehicle B in the specified alignment sequence, the transmission timing of the on-vehicle wireless communication apparatus 1 in the vehicle B is adjusted to be delayed from the transmission timing of the on-vehicle wireless communication apparatus 1 in the vehicle A by 10 msec. More specifically, the transmission timing is gradually adjusted through plural times of transmission of the transmission data as illustrated in FIG. 4 while temporarily changing the transmission period of the transmission data to a shorter transmission period.

Further, in the on-vehicle wireless communication apparatus 1 of the vehicle C, the alignment sequence is specified as the stated order of the vehicle A, the vehicle B, and the vehicle C in the location specifying process, on the basis of the transmission data received from the on-vehicle wireless communication apparatuses 1 of the vehicles A and B. Since the vehicle B having the same travel direction is located immediately in front of the vehicle C in the specified alignment sequence, the transmission timing of the on-vehicle wireless communication apparatus 1 in the vehicle C is adjusted to be delayed from the transmission timing of the on-vehicle wireless communication apparatus 1 in the vehicle B by 10 msec. More specifically, in order that the transmission timing first matches 10 msec after the transmission timing of the on-vehicle wireless communication apparatus 1 in the vehicle B, which is delayed from the transmission timing of the subject vehicle, the transmission timing is adjusted through one transmission of the transmission data as illustrated in FIG. 4 while temporarily changing the transmission period of the transmission data to a longer transmission period. Thereafter, the transmission timing is adjusted while temporarily changing the transmission period of the transmission data to a shorter transmission period so that the transmission timing of the subject apparatus matches 10 msec after the transmission timing of the vehicle B while the transmission timing of the on-vehicle wireless communication apparatus 1 in the vehicle B is gradually changed.

As a result, as illustrated in an upper stage of FIG. 4, the transmission timing of the on-vehicle wireless communication apparatuses 1 of the vehicles A to C, which is different from the alignment sequence of the vehicles A to C, is identical with the alignment sequence of the vehicles A to C as illustrated in a lower stage of FIG. 4. Also, the respective transmission timing is adjusted to be shifted by 10 msec for transmission.

As described above, in this embodiment, the transmission timing of the on-vehicle wireless communication apparatuses 1 mounted in a posterior vehicles in the alignment sequence is adjusted to be shifted by a given time with reference to the transmission timing of the on-vehicle wireless communication apparatus 1 mounted in the leading vehicle in the alignment sequence. Hence, the transmission data of the respective on-vehicle wireless communication apparatuses 1 does not collide with each other, thereby making it hard to damage the real time property of the data communication, and also making it possible to avoid the congestion. Also, since the transmission data is transmitted in sequence from the on-vehicle wireless communication apparatus 1 of the lead head with given intervals, the transmission data from the on-vehicle wireless communication apparatus 1 mounted in the vehicle located in front of the subject vehicle can be more rapidly received by the on-vehicle wireless communication apparatus 1 of the subject vehicle.

According to this embodiment, even if the CSMA/CA system is used for the inter-vehicle communication of the on-vehicle wireless communication apparatus 1, a time for waiting for the free communication channel is reduced, thereby being capable of making it hard to damage the real time property of the data communication.

In this embodiment, the alignment sequence in the travel direction of the subject vehicle is specified, and the transmission timing of the subject apparatus is adjusted so that the transmission data is transmitted at the timing of the given time after the transmission timing of the on-vehicle wireless communication apparatus 1 mounted in the other vehicle having the same travel direction, which is located immediately in front of the subject vehicle in the alignment sequence. However, the present disclosure is not limited to this configuration.

For example, the alignment sequence in a given direction such as an opposite direction to the travel direction of the subject vehicle is specified, and the transmission timing of the subject apparatus is adjusted so that the transmission data is transmitted at the timing of the given time after the transmission timing of the on-vehicle wireless communication apparatus 1 mounted in the other vehicle (in the same travel direction or the opposite direction) located immediately in front of the subject vehicle in the alignment sequence. Even in the above configuration, the transmission timing of the respective on-vehicle wireless communication apparatuses 1 can be shifted by the given time for transmitting the transmission data, thereby being capable of making it hard to damage the real time property of the data communication.

Returning to FIG. 2, when receiving the transmission data including the important information from the on-vehicle wireless communication apparatus 1 of the other vehicle, the controller 12 transmits the important information with the addition of the transmission data transmitted from the on-vehicle wireless communication apparatus 1 of the subject vehicle for transfer as the occasion demands. When the transmission data is transmitted with the inclusion of the important information, information indicative of the type of important information is additionally transmitted. At a receiver side, the type of important information is discriminable on the basis of the information indicative of the type of important information. Also, information other than the important information may be transferred.

Figure 5:
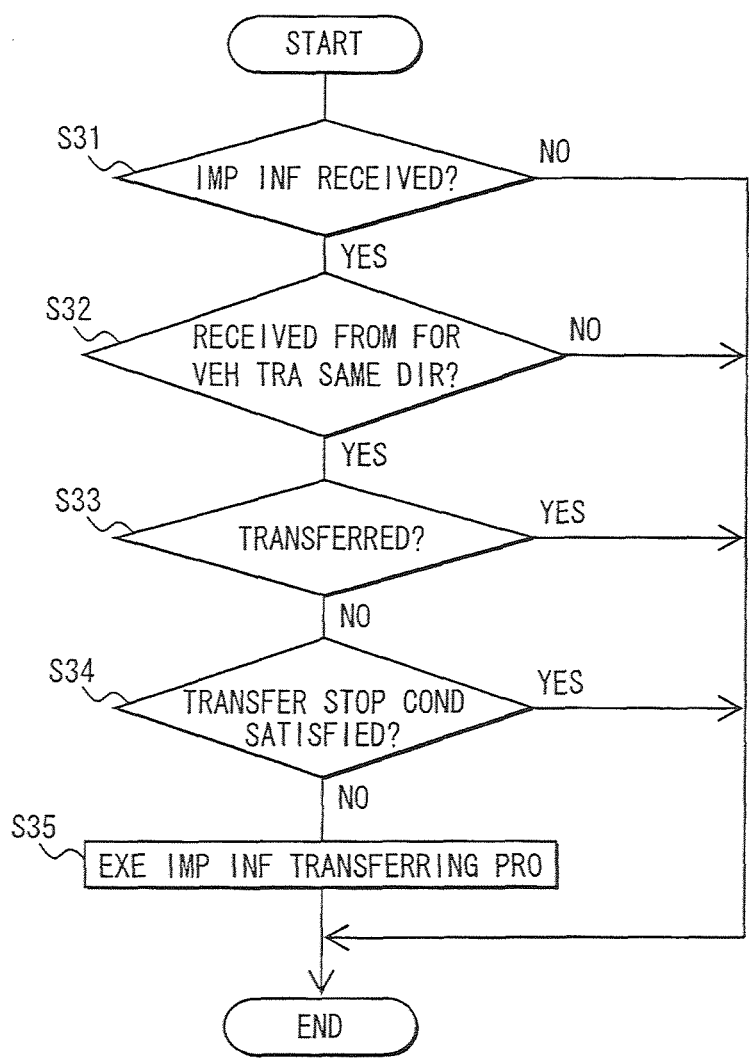
FIG. 5 is a flowchart illustrating a flow of transfer related processing in the controller of the on-vehicle wireless communication apparatus.

Now, a description will be given of processing (hereinafter referred to as "transfer related processing") related to transfer of the important information in the controller 12. FIG. 5 is a flowchart illustrating a flow of transfer related processing in the controller 12 of the on-vehicle wireless communication apparatus 1. This flow starts when receiving the transmission data from the on-vehicle wireless communication apparatus 1 of the other vehicle. Also, it is conceivable that the important information particularly affects the travel of a following vehicle. Therefore, in the following description, it is assumed that the transmission timing of the subject apparatus is adjusted so that the transmission data is transmitted at the timing of the given time after the transmission timing of the on-vehicle wireless communication apparatus 1 mounted in the other vehicle located immediately in front of the subject vehicle in the alignment sequence in the travel direction of the subject vehicle.

In Step S31, it is determined whether the important information has been received, or not. Whether the important information has been received, or not, may be determined according to whether the important information is included in the transmission data, or not. If it is determined that the important information is included therein (yes in Step S31), the processing is shifted to Step S32. Also, if it is determined that the important information is not included therein (no in Step S31), the flow is completed.

In Step S32, it is determined whether the other vehicle which is a transmission source of the transmission data received by the wireless communication unit 11 is the forward vehicle having the same travel direction as that of the subject vehicle, or not. Whether the other vehicle of the transmission source is the forward vehicle having the same travel direction as that of the subject vehicle, or not, may be determined by using data of the alignment sequence specified in the above-mentioned alignment sequence specifying process, or determined on the basis of the positional information and the travel direction information on the other vehicle included in the transmission data, and the positional information and the travel direction information on the subject vehicle. In this example, only the forward vehicles on the same track such as the same lane as that of the subject vehicle may be targeted for the determination, or the forward vehicles on different tracks such as different lanes from the track of the subject vehicle may be also targeted for the determination. The forward vehicles on the same track or the forward vehicles on the different tracks may be discriminated by the aid of, for example, the map data, or imaging data of a forward camera not shown.

Then, if it is determined that the forward vehicles are located in the same travel direction as that of the subject vehicle (yes in Step S32), the processing is shifted to Step S33. Also, if it is determined that the forward vehicles are not located in the same travel direction as that of the subject vehicle (no in Step S32), the flow is completed.

In Step S33, it is determined whether the received important information has been already transferred, or not. Whether the received important information has been already transferred, or not, may be determined on the basis of the source information added to the important information. As will be described later, in this embodiment, when the important information has been transferred, it is assumed that, for example, the type of important information and the source information are stored in a memory such as a RAM in association with each other. In this case, whether the important information has been already transferred, or not, may be determined according to whether the combination of the type of received important information with the source information added to the important information has been already stored in the above memory, or not.

That is, if the combination of the important information included in the transmission data received by the wireless communication unit 11 with the source information has been stored in the memory, it is determined that the important information from the same transmission source has been already transferred. Hence, the controller 12 corresponds to a transferred information storage unit and a transfer determining unit.

Then, if it is determined that the important information has been already transferred (yes in Step S33), the flow is completed without transfer. Also, if it is not determined that the important information has been already transferred (no in Step S33), the processing is shifted to Step S34.

In Step S34, it is determined whether to satisfy a condition for stopping the transfer of the important information (that is, transfer stop condition), or not. Then, if it is determined that the transfer stop condition is satisfied (yes in Step S34), the flow is completed without transfer. Also, if it is determined that the transfer stop condition is not satisfied (no in Step S34), the processing is shifted to Step S35.

Now, an example of the transfer stop condition will be described. A transfer frequency can be specified as the transfer stop condition. If the transfer frequency is specified as the transfer stop condition, when the transmission data is transmitted with the inclusion of the important information, the important information is transmitted with the addition of information on the transfer frequency along with a predetermined upper limit of the transfer frequency as the transfer stop conditions.

For example, if the transmission data is transmitted with the inclusion of the important information acquired by the subject vehicle, the transmission data may be transmitted with the addition of information indicating that the transfer frequency is "0". Also, if the important information is transferred, the important information may be transmitted with the addition of information on the transfer frequency obtained by incrementing the transfer frequency indicated by the information on the transfer frequency included in the transmission data received in the wireless communication unit 11 by one.

If the transfer frequency is used as the transfer stop condition, it is determined in Step S34 whether the transfer frequency indicated by the information on the transfer frequency included in the transmission data received in the wireless communication unit 11 has exceeded the predetermined upper limit of the transfer frequency, or not, to determine whether to satisfy the transfer stop condition, or not.

In addition, if the transfer frequency is specified as the transfer stop condition, when the transmission data including the important information is transmitted, the important information may be transmitted with the addition of information on a predetermined remaining value of the transfer frequency as the transfer stop condition. In this case, for example, if the important information is transferred, the important information may be transmitted with the addition of information on the remaining transfer frequency obtained by decrementing the remaining transfer frequency indicated by the information on the remaining value of transfer frequency included in the transmission data received in the wireless communication unit 11 by one, as the information on the remaining value of transfer frequency.

Then, when the remaining value of transfer frequency is used as the transfer stop condition, it is determined in Step S34 whether the remaining transfer frequency indicated by the information on the remaining value of transfer frequency included in the transmission data received in the wireless communication unit 11 has become zero, or not, to determine whether to satisfy the transfer stop condition, or not.

Also, a distance from the vehicle (hereinafter referred to as "transmission origin") mounting the on-vehicle wireless communication apparatus 1 that has first transmitted the important information therein can be specified as the transfer stop condition. If the distance from the transmission origin is specified as the transfer stop condition, when the transmission data including the important information is transmitted, the important information is transmitted with the addition of the positional information on the transmission origin together with the distance from the transmission origin specified as the transfer stop condition.

When the distance from the transmission origin is used as the transfer stop condition, it is determined whether to satisfy the transfer stop condition, or not, according to whether a distance between the position indicated by the positional information on the transmission origin included in the transmission data received by the wireless communication unit 11 and the position indicated by the positional information on the subject vehicle has exceeded the distance from the transmission origin specified as the transfer stop condition, or not.

Further, if the distance from the transmission origin is specified as the transfer stop condition, when the transmission data including the important information is transmitted, the important information is transmitted with the addition of information on a predetermined remaining value of a total transmission distance and the positional information on the transmission source (on-vehicle wireless communication apparatus 1 that transmits or transfers information) as the transfer stop condition. In this case, the transmission distance of the important information is calculated according to the positional information on the transmission source and the positional information on the subject vehicle. Then, the calculated transmission distance is subtracted from the remaining transmission distance indicated by the information on the remaining value of the total transmission distance included in the transmission data received by the wireless communication unit 11. Then, when the important information is transferred, the important information is transmitted with the addition of the information on the remaining transmission distance, which has been subjected to subtraction, as the information on the remaining value of the total transmission distance.

When the remaining value of the total transmission distance is used as the transfer stop condition, in Step S34, it is determined whether the remaining transmission distance indicated by the information on the remaining value of the total transmission distance included in the transmission data received in the wireless communication unit 11 has become zero, or not, to determine whether to satisfy the transfer stop condition, or not.

In addition, the elapsed time since the important information has been first transmitted can be specified as the transfer stop condition. If the elapsed time since the important information has been first transmitted is specified as the transfer stop condition, when the transmission data including the important information is transmitted, the important information is transmitted with the addition of the GPS time at the time of first transmitting the important information together with the elapsed time specified as the transfer stop condition.

Then, when the elapsed time since the important information has been first transmitted is used as the transfer stop condition, in Step S34, it is determined whether to satisfy the transfer stop condition, or not, according to whether the elapsed time since the GPS time at the time of first transmitting the important information, which has been included in the transmission data received in the wireless communication unit 11, has exceeded the elapsed time specified as the transfer stop condition, or not. Even when any type of the transfer stop conditions described above is used, the range that the important information is transferred can be limited.

In Step S35, an important information transferring process is conducted, and the flow is completed. In the important information transferring process, the source information and the transfer stop condition, which have been added to the important information received by the wireless communication unit 11, are added to the important information, included in the transmission data of the subject vehicle, and transmitted from the wireless communication unit 11 to transfer the important information. When the transmission data including the important information is received from the other vehicle, and the important information is acquired from the subject vehicle during an interval between when one piece of transmission data is transmitted and when a subsequent piece of transmission data is transmitted, the important information acquired by the subject vehicle is preferentially transmitted. For example, only the important information acquired by the subject vehicle may be transmitted without transmission of the important information received from the other vehicle. Also, in the important information transferring process, when the important information has been transferred, the type of the important information and the source information added to the important information are stored in the memory such as a RAM in association with each other.

Because the important information affects the travel of the other vehicles around the subject vehicle, a vehicle located at the rear of a certain vehicle wants to receive the important information as quickly as possible. On the contrary, according to the above-mentioned configuration, the transmission data including the important information transmitted from the on-vehicle wireless communication apparatus 1 mounted in the vehicle located in front of the subject vehicle can be received more quickly. Therefore, it is possible to conduct control according to the important information on the vehicle located in front of the subject vehicle more quickly. For example, when the control of the subject vehicle is conducted by receiving information on behavior of the vehicle located anteriorly such as a known vehicle following control, it is possible to conduct the control of the subject vehicle according to the behavior of the vehicle located anteriorly more quickly.

Also, according to the above configuration, even if there are the on-vehicle wireless communication apparatuses 1 that cannot directly transmit and receive the important information with each other due to an obstacle, since the important information is transferred via another on-vehicle wireless communication apparatus 1, it is possible to indirectly transmit and receive the important information. Hence, according to the above configuration, it is possible to more improve the reliability of the data communication.

Figure 6:
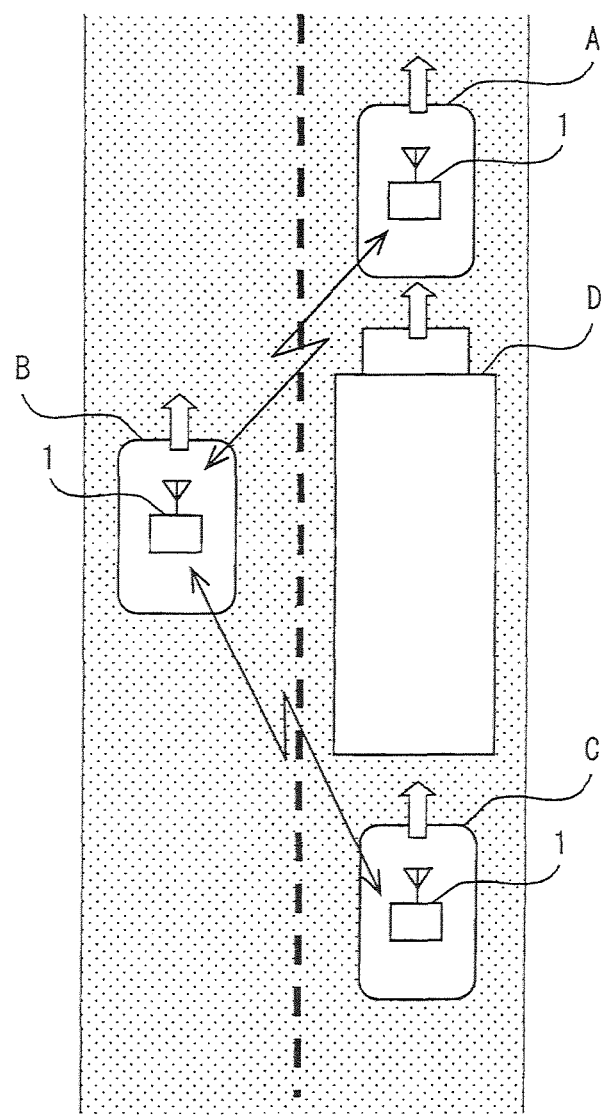
FIG. 6 is a schematic diagram explaining an example of advantages of the on-vehicle wireless communication apparatus.

The above-mentioned advantages will be described with reference to FIG. 6. FIG. 6 is a schematic diagram illustrating an example of advantages of the present disclosure. Symbols A to C in FIG. 6 indicate the vehicles A to C each having the on-vehicle wireless communication apparatus 1 mounted therein, and a symbol D indicates a large truck having no on-vehicle wireless communication apparatus 1 mounted therein. Also, arrows in FIG. 6 represent the travel directions of the respective vehicles.

For example, a description will be given of a case in which the large truck D is located between the vehicle A and the vehicle C, and blocks the inter-vehicle communication between the vehicle A and the vehicle C as illustrated in FIG. 6 with the result that the important information transmitted from the vehicle A cannot be received directly from the vehicle A by the vehicle C. Even in this case, if a side-by-side vehicle B is located at a position that enables the inter-vehicle communication with both of the vehicle A and the vehicle C, the transmission data is sequentially transmitted in the stated order of the vehicle A, the vehicle B, and the vehicle C, and the important information transmitted from the vehicle A is transferred from the vehicle B to the vehicle C. Also, since the transmission data is sequentially transmitted in the stated order of the vehicle A, the vehicle B, and the vehicle C, the important information included in the transmission data and transferred is transferred from the vehicle A to the vehicle C through the vehicle B more quickly.

In the above-mentioned embodiment, only the important information received from the other vehicle having the same travel direction which is located in front of the subject vehicle is transferred. However, the present disclosure is not limited to this configuration. For example, particularly as the important information that affects the travel of the other vehicles around the subject vehicle, the important information received from the other vehicles except for the vehicle having the same travel direction which is located in front of the subject vehicle may be also transferred.

Figure 7:
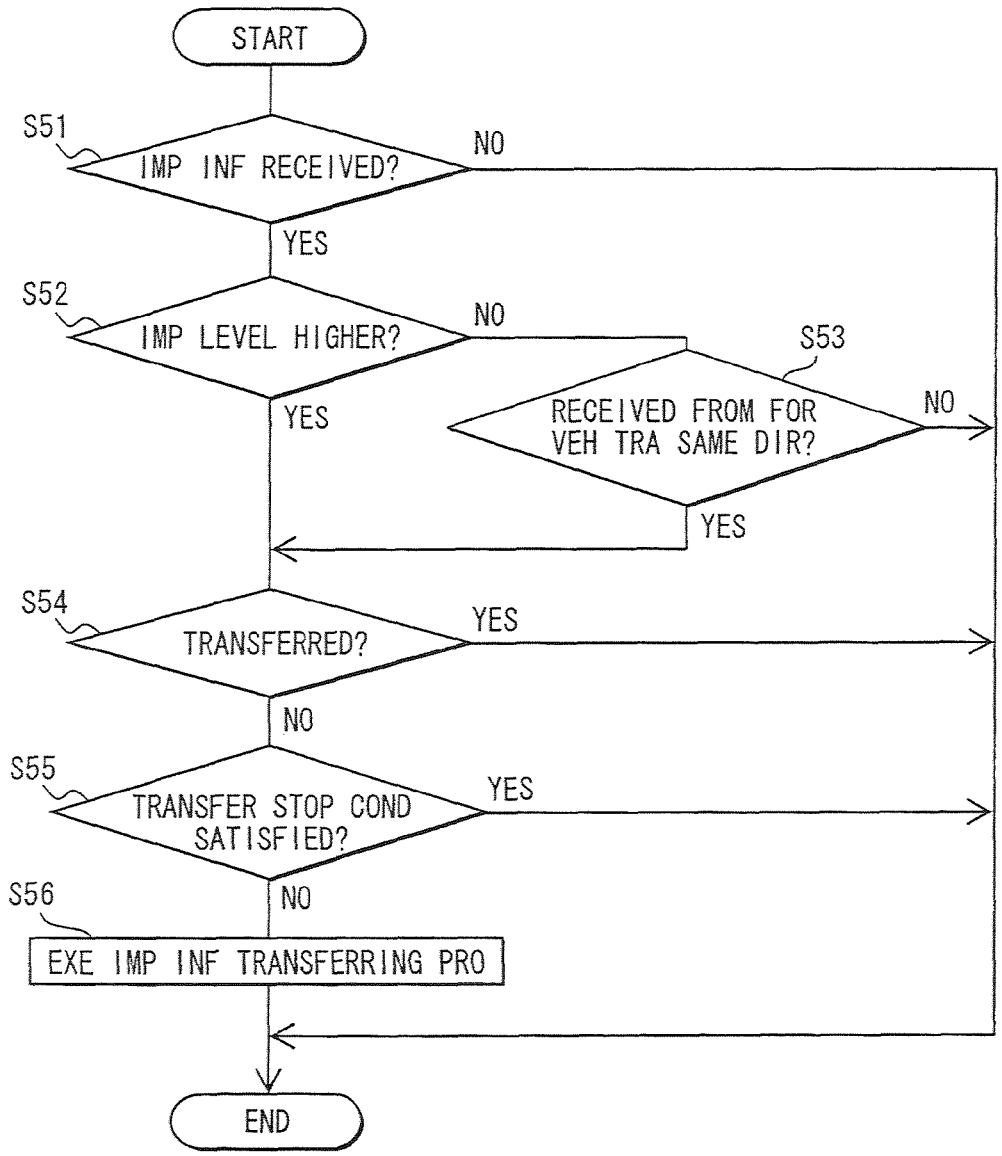
FIG. 7 is a flowchart illustrating a flow of processing related to the transferring process according to an importance level of important information.

Hereinafter, a description will be given of a transferring process according to an importance of the important information. FIG. 7 is a flowchart illustrating a flow of processing related to the transferring process according to the importance of the important information. This flow starts when receiving the transmission data from the on-vehicle wireless communication apparatuses 1 of the other vehicles.

Also, it is assumed that the important information has a plurality of levels for each importance. In this embodiment, when the important information is acquired, the importance is allocated according to the type or numerical number of important information by the controller 12. When the transmission data is transmitted with the inclusion of the important information, the importance of the important information is added and transmitted.

The importance is classified into particularly significant important information (hereinafter referred to as "particular important information") having a given importance or higher, and a normal important information (hereinafter referred to as "normal important information") lower than the given importance. For example, safety device actuation information and information on sudden braking and abrupt steering among the vehicle state information correspond to the particular important information.

Information that a longitudinal acceleration is equal to or lower than a given negative threshold value among the information on the longitudinal acceleration detected by the acceleration sensor 31 corresponds to the information on the sudden braking. In the present specification, the given negative threshold value is a value corresponding to deceleration regarded as the sudden braking. Aside from the longitudinal acceleration, a rapid decrease value of a vehicle speed per unit time and a rapid increase value of a brake fluid pressure detected by a brake pressure sensor per unit time also correspond to the information on the sudden braking.

Also, information that an absolute value of a variation of a steering angle of a steering detected according to a signal from a steering angle sensor per unit time is equal to or higher than a given threshold value among information on the variation corresponds to the information on the abrupt steering. In the present specification, the given threshold value is a value corresponding to an absolute value of the variation of the steering angle regarded as the abrupt steering. Aside from the steering angle, a large lateral acceleration detected according to the signal of the acceleration sensor 31 also corresponds to the information on the abrupt steering. The normal information other than the particular important information corresponds to the normal important information.

First, in Step S51, it is determined whether the important information has been received, or not, like Step S31. If it is determined that the important information is included (yes in Step S51), the processing is shifted to Step S52. If it is determined that no important information is included (no in Step S51), the flow is completed.

In Step S52, it is determined whether the importance of the important information is equal to or higher than a given value, or not, on the basis of the importance added to the received important information. In more detail, it is determined whether the important information has the importance corresponding to the particular important information or higher, or not. Then, if it is determined that the importance is equal to or higher than the given value (yes in Step S52), the important information is determined to be the particular important information, and the processing is shifted to Step S54. Also, if it is determined that the important information is lower than the given value (no in Step S52), the important information is determined to be the normal important information, and the processing is shifted to Step S53.

In Step S53, it is determined whether the other vehicle, which is the transmission source of the transmission data received by the wireless communication unit 11, is the forward vehicle having the same travel direction as that of the subject vehicle, or not, like Step S32. Then, if it is determined that the other vehicle is the forward vehicle having the same travel direction as that of the subject vehicle (yes in Step S53), the processing is shifted to Step S54. On the other hand, if it is determined that the other vehicle is not the forward vehicle having the same travel direction as that of the subject vehicle (no in Step S53), the flow is completed.

In this example, only the forward vehicles on the same track such as the same lane as that of the subject vehicle may be targeted for the determination, or the forward vehicles on different tracks such as different lanes from the track of the subject vehicle may be also targeted for the determination. The forward vehicles on the same track or the forward vehicles on the different tracks may be discriminated by the aid of, for example, the map data, or imaging data of a forward camera not shown.

In Step S54, it is determined whether the received important information has been already transferred, or not, as in Step S33. Then, if it is determined that the important information has n already transferred (yes in Step S54), the flow is completed without transfer. Also, if it is not determined that the important information has been already transferred (no in Step S54), the processing is shifted to Step S55.

In Step S55, it is determined whether to satisfy the transfer stop condition, or not, as in Step S34. Then, if it is determined that the transfer stop condition is satisfied (yes in Step S55), the flow is completed without transfer. Also, if it is determined that the transfer stop condition is not satisfied (no in Step S55), the processing is shifted to Step S56.

In Step S56, the important information transferring process is conducted as in Step S35, and the flow is completed. A difference from Step S35 resides in that the important information is transferred with the addition of the information on the importance added to the important information received by the wireless communication unit 11.

Because the important information affects the travel of the other vehicles around the subject vehicle, a vehicle located at the rear of a certain vehicle wants to receive the important information as quickly as possible. On the contrary, according to the above-mentioned configuration, the transmission data including the important information transmitted from the on-vehicle wireless communication apparatus 1 mounted in the vehicle located in front of the subject vehicle can be received more quickly. Therefore, it is possible to conduct control according to the important information on the vehicle located in front of the subject vehicle more quickly. For example, when the control of the subject vehicle is conducted by receiving information on behavior of the vehicle located anteriorly such as a known vehicle following control, it is possible to conduct the control of the subject vehicle according to the behavior of the vehicle located anteriorly more quickly.

According to the above configuration, if the important information is equal to or higher than the given importance, since the important information received from the forward vehicle having the travel direction different from that of the subject vehicle is also transferred, the important information particularly high in the importance, which is received from not only the leading vehicle but also an oncoming vehicle, can be transferred.

In the above-mentioned embodiment, the important information is transferred. However, the present disclosure is not limited to this configuration, but information other than the important information may be transferred.

In the above-mentioned embodiment, automobiles are exemplified as the vehicles. However, the present disclosure is applicable to other vehicles such as two wheels and powered wheelchairs.

The above disclosure has the following aspects.

According to an aspect of the present disclosure, an on-vehicle wireless communication apparatus mounted on a vehicle for transmitting transmission data wirelessly at a predetermined frequency, the transmission data including at least positional information of the vehicle, the apparatus includes: a receiver that sequentially receives the transmission data transmitted from another on-vehicle wireless communication apparatus mounted on another vehicle; a positional information acquiring unit that sequentially acquires the positional information of the vehicle; a location specifying unit that specifies a location relationship between the vehicle and the another vehicle based on the positional information of the vehicle acquired by the positional information acquiring unit and the positional information of the another vehicle received by the receiver; an another-apparatus transmission timing specifying unit that specifies a transmission timing of the transmission data in the another on-vehicle wireless communication apparatus when the another vehicle is located immediately in front of the vehicle; and a transmission timing adjusting unit that adjusts a transmission timing of the transmission data to be transmitted from the on-vehicle wireless communication apparatus so that the transmission data is transmitted at the predetermined frequency with an adjusted transmission timing of the on-vehicle wireless communication apparatus, which is later by a predetermined time than the transmission timing of the another on-vehicle wireless communication apparatus.

In the above apparatus, when the vehicles each having the on-vehicle wireless communication apparatus mounted therein are lined up, the transmission timing is adjusted in each on-vehicle wireless communication apparatus so that the transmission timing is shifted by given times according to locations of the vehicles. Also, since the transmission timing of each on-vehicle wireless communication apparatus is so adjusted as to be shifted by given times, the transmission data of each on-vehicle wireless communication apparatus does not collide with each other, thereby making it hard to damage the real time property of the data communication. Therefore, the configuration according to the aspect can make it hard to damage the real time property of the data communication in the inter-vehicle communication.

Alternatively, the transmission timing adjusting unit may temporarily change the predetermined frequency of the transmission data in the on-vehicle wireless communication apparatus to adjust the transmission timing of the on-vehicle wireless communication apparatus so that the transmission timing of the on-vehicle wireless communication apparatus stepwisely comes closer to the adjusted transmission timing of the on-vehicle wireless communication apparatus every time the transmission data is transmitted. In this case, since the transmission timing of the transmission data from the subject apparatus gradually comes closer to the timing of the given time after the transmission timing specified by the other-apparatus transmission timing specifying unit, it is possible to adjust the transmission timing without rapidly changing the transmission period of the transmission data.

Alternatively, a lower limit of the predetermined frequency may be defined when the transmission timing adjusting unit temporarily changes the predetermined frequency. The transmission timing adjusting unit adjusts the transmission timing of the on-vehicle wireless communication apparatus so as not to fall below the lower limit when the transmission timing adjusting unit temporarily changes the predetermined frequency. In this case, when the lower limit of the transmission period is defined in a change in the transmission period of the transmission data, it is possible to adjust the transmission timing without rapidly changing the transmission period of the transmission data while complying with the definition.

Alternatively, the transmission timing adjusting unit may not adjust the transmission timing of the on-vehicle wireless communication apparatus when the another vehicle is not located immediately in front of the vehicle. In this case, the transmission timing of the on-vehicle wireless communication apparatus mounted in a vehicle located posteriorly can be adjusted to be shifted by a given time on the basis of the transmission timing of the transmission data in the on-vehicle wireless communication apparatus mounted in a leading vehicle in the location specified by the location specifying unit.

Alternatively, the transmission data may further include at least travel direction information of the vehicle in addition to the positional information of the vehicle. Further, the on-vehicle wireless communication apparatus further includes: a travel direction information acquiring unit that sequentially acquires the travel direction information of the vehicle. The location specifying unit specifies the location relationship between the vehicle and the another vehicle disposed in a travel direction of the vehicle based on the positional information of the vehicle, the travel direction information of the vehicle acquired by the travel direction information acquiring unit, and the positional information and the travel direction information of the another vehicle received by the receiver. The other-apparatus transmission timing specifying unit specifies the transmission timing of the another on-vehicle wireless communication apparatus when the another vehicle having a travel direction equal to the travel direction of the vehicle is located immediately in front of the vehicle. In this case, the transmission timing is adjusted in the on-vehicle wireless communication apparatus of each vehicle so that the transmission timing is shifted by the given time according to the location in the traveling direction of each vehicle having the same traveling direction. Hence, the transmission data is sequentially transmitted from the on-vehicle wireless communication apparatus of the leading vehicle at given time intervals. Even in this configuration, since the transmission data of each on-vehicle wireless communication apparatus does not collide with each other, it is hard to damage the real time property of the data communication. Also, since the transmission data is sequentially transmitted from the on-vehicle wireless communication apparatus of the leading vehicle at given time intervals, it is possible to more rapidly receive the transmission data from the on-vehicle wireless communication apparatus mounted in the vehicle located in front of the subject vehicle.

Alternatively, the transmission data to be transmitted from the on-vehicle wireless communication apparatus may further include the transmission data of the another on-vehicle wireless communication apparatus received by the receiver. In this case, even if there are the on-vehicle wireless communication apparatuses that cannot directly transmit and receive the information with each other due to an obstacle, since the information is transferred via another on-vehicle wireless communication apparatus, it is possible to indirectly transmit and receive the information.

Alternatively, the on-vehicle wireless communication apparatus may further include: an important information acquiring unit that acquires important information, which affects a travel condition of other vehicles disposed around the vehicle. When the important information acquiring unit acquires the important information, the transmission data to be transmitted from the on-vehicle wireless communication apparatus further includes the important information of the vehicle. When the another vehicle having the travel direction equal to the travel direction of the vehicle is located immediately in front of the vehicle, and the transmission data of the another on-vehicle wireless communication apparatus includes important information, the transmission data to be transmitted from the on-vehicle wireless communication apparatus further includes the important information of the another on-vehicle wireless communication apparatus. In this case, because the important information affects the travel of the other vehicles around the subject vehicle, a vehicle located at the rear of a certain vehicle wants to receive the important information as quickly as possible. On the contrary, the transmission data including the important information transmitted from the on-vehicle wireless communication apparatus mounted in the vehicle located in front of the subject vehicle can be received more quickly. Therefore, it is possible to conduct control according to the important information on the vehicle located in front of the subject vehicle more quickly. For example, when the control of the subject vehicle is conducted by receiving information on behavior of the vehicle located anteriorly such as a known vehicle following control, it is possible to conduct the control of the subject vehicle according to the behavior of the vehicle located anteriorly more quickly. Also, even if there are the on-vehicle wireless communication apparatuses that cannot directly transmit and receive the important information with each other due to an obstacle, since the important information is transferred via another on-vehicle wireless communication apparatus, it is possible to indirectly transmit and receive the important information. Hence, it is possible to more improve the reliability of the data communication.

Alternatively, the location specifying unit may specify, in the location relationship between the vehicle and the another vehicle disposed in the travel direction of the vehicle, whether the vehicle and the another vehicle are located on a same track. When the another vehicle having the travel direction equal to the travel direction of the vehicle is located immediately in front of the vehicle on the same track, and the transmission data of the another on-vehicle wireless communication apparatus includes important information, the transmission data to be transmitted from the on-vehicle wireless communication apparatus further includes the important information of the another on-vehicle wireless communication apparatus.

Alternatively, the location specifying unit may specify, in the location relationship between the vehicle and the another vehicle disposed in the travel direction of the vehicle, whether the vehicle and the another vehicle are located on a same track. When the another vehicle having the travel direction equal to the travel direction of the vehicle is located immediately in front of the vehicle on a track different from a track of the vehicle, and the transmission data of the another on-vehicle wireless communication apparatus includes important information, the transmission data to be transmitted from the on-vehicle wireless communication apparatus further includes the important information of the another on-vehicle wireless communication apparatus. Here, the same track includes not only the tracks completely coinciding with each other, but also, for example, a range of the same lane.

Alternatively, the on-vehicle wireless communication apparatus may further include: an important information acquiring unit that acquires important information, which affects a travel condition of other vehicles disposed around the vehicle. When the important information acquiring unit acquires the important information, the transmission data to be transmitted from the on-vehicle wireless communication apparatus further includes the important information. The important information has a level, which defines an importance degree. When the importance degree of the important information received from the another on-vehicle wireless communication apparatus is lower than a predetermined importance degree, the transmission data to be transmitted from the on-vehicle wireless communication apparatus further includes the important information of the another on-vehicle wireless communication apparatus mounted in the another vehicle, which has the travel direction equal to the travel direction of the vehicle and is located in front of the vehicle. When the importance degree of the important information received from the another on-vehicle wireless communication apparatus is equal to or higher than the predetermined importance degree, the transmission data to be transmitted from the on-vehicle wireless communication apparatus further includes the important information of the another on-vehicle wireless communication apparatus mounted in the another vehicle, which is located in front of the vehicle. In this case, because the important information affects the travel of the other vehicles around the subject vehicle, a vehicle located at the rear of a certain vehicle wants to receive the important information as quickly as possible. On the contrary, the transmission data including the important information transmitted from the on-vehicle wireless communication apparatus mounted in the vehicle located in front of the subject vehicle can be received more quickly. Therefore, it is possible to conduct control according to the important information on the vehicle located in front of the subject vehicle more quickly. For example, when the control of the subject vehicle is conducted by receiving information on behavior of the vehicle located anteriorly such as a known vehicle following control, it is possible to conduct the control of the subject vehicle according to the behavior of the vehicle located anteriorly more quickly. Also, even if there are the on-vehicle wireless communication apparatuses that cannot directly transmit and receive the important information with each other due to an obstacle, since the important information is transferred via another on-vehicle wireless communication apparatus, it is possible to indirectly transmit and receive the important information. Hence, it is possible to more improve the reliability of the data communication. Further, if the important information is equal to or higher than the given importance, since the important information received from the forward vehicle having the travel direction different from that of the subject vehicle is also transferred, the important information particularly high in the importance, which is received from not only the leading vehicle but also an oncoming vehicle, can be transferred.

Alternatively, the important information may include at least one of information related to a change in behavior of the vehicle, actuation information of a device that is actuated upon detecting contact between the vehicle and an obstacle, and actuation information of a device that is actuated upon detecting a dangerousness of contact between the vehicle and the obstacle. In this case, the information on the change in the behavior of the subject vehicle, or the actuation information on the device that is actuated upon detecting that the subject vehicle comes into contact with the obstacle are transmitted to the other vehicle so that the other vehicle can tackle the change in the behavior of the subject vehicle.

Alternatively, when the transmission data including the important information is transmitted, the important information includes transfer stop condition information that specifies a condition for stopping transfer of the important information. In this case, when the transmission data including the important information is transmitted, since the important information is transmitted with the addition of transfer stop condition information defining a condition for stopping transfer of the important information, a range that the important information is transferred can be limited.

Alternatively, the transfer stop condition information may specify a transfer frequency as the condition for stopping the transfer of the important information. In this case, since the important information exceeding the upper limit of the transfer frequency, which is defined by the transfer stop condition information, is not transferred, the range that the important information is transferred can be limited. Also, since the range that the important information is transferred is limited, the important information can be prevented from being transmitted to the on-vehicle wireless communication apparatus mounted in a vehicle that is distant from the vehicle that is a transmission source of the important information and has a low need to use the important information. Therefore, the important information is prevented from being transmitted to the on-vehicle wireless communication apparatus having a high possibility of needing no important information so that processing costs and a communication volume can be suppressed as much.

Alternatively, the transfer stop condition information may specify a distance from a transmission original position, at which an on-vehicle wireless communication apparatus initially transmits the important information, to a current position of the vehicle as the condition for stopping the transfer of the important information. In this case, since the important information is not transferred from the on-vehicle wireless communication apparatus of the vehicle located at a position exceeding the distance from the transmission origin, which is defined in the transfer stop condition information, the range that the important information is transferred can be limited. Also, since the range that the important information is transferred is limited, the important information can be prevented from being transmitted to the on-vehicle wireless communication apparatus mounted in the vehicle that is distant from the vehicle that is the transmission origin, and has a low need to use the important information. Therefore, the important information is prevented from being transmitted to the on-vehicle wireless communication apparatus having a high possibility of needing no important information so that the processing costs and the communication volume can be suppressed as much.

Alternatively, when the transmission data including the important information is transmitted, the transmission data may further include source information that defines a transmission source vehicle of the important information. The on-vehicle wireless communication apparatus further includes: a transferred information storage unit that stores the source information of the important information when the important information has been transferred; and a transfer determining unit that determines whether the important information has been already transferred, based on the source information in the transmission data received by the receiver and the source information stored in the transferred information storage unit when the transmission data received by the receiver includes the important information. When the transfer determining unit determines that the important information has been already transferred, the important information is not transferred. In this case, when the important information has the same transmission source as that of the transferred important information, even if the transmission data including the important information is received by the receiver, the important information is not transferred. Hence, since the transferred important information is not again transferred, the important information is not needlessly transferred from one on-vehicle wireless communication apparatus so that the processing costs and the communication volume can be suppressed as much.

According to another aspect of the present disclosure, a communication system includes a plurality of on-vehicle wireless communication apparatuses. Each on-vehicle wireless communication apparatus is defined according to the aspect of the present disclosure. Each on-vehicle wireless communication apparatus is mounted on a respective vehicle.

The above communication system includes any one of the respective on-vehicle wireless communication apparatuses mounted in a plurality of vehicles, thereby being capable of making it hard to damage the real time property of the data communication.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An on-vehicle wireless communication apparatus mounted on a vehicle for transmitting transmission data wirelessly at a predetermined frequency, the transmission data including at least positional information of the vehicle, the apparatus comprising:
a receiver that sequentially receives the transmission data transmitted from another on-vehicle wireless communication apparatus mounted on another vehicle;
a positional information acquiring unit that sequentially acquires the positional information of the vehicle;
a location specifying unit that specifies a location relationship between the vehicle and the another vehicle based on the positional information of the vehicle acquired by the positional information acquiring unit and the positional information of the another vehicle received by the receiver;
an another-apparatus transmission timing specifying unit that specifies a transmission timing of the transmission data in the another on-vehicle wireless communication apparatus when the another vehicle is located immediately in front of the vehicle; and
a transmission timing adjusting unit that adjusts a transmission timing of the transmission data to be transmitted from the on-vehicle wireless communication apparatus so that the transmission data is transmitted at the predetermined frequency with an adjusted transmission timing of the on-vehicle wireless communication apparatus, which is later by a predetermined time than the transmission timing of the another on-vehicle wireless communication apparatus; wherein
the transmission timing adjusting unit temporarily changes the predetermined frequency of the transmission data in the on-vehicle wireless communication apparatus to adjust the transmission timing of the on-vehicle wireless communication apparatus so that the transmission timing of the on-vehicle wireless communication apparatus step-wisely comes closer to the adjusted transmission timing of the on-vehicle wireless communication apparatus every time the transmission data is transmitted.

2. The on-vehicle wireless communication apparatus according to claim 1,
wherein a lower limit of the predetermined frequency is defined when the transmission timing adjusting unit temporarily changes the predetermined frequency, and
wherein the transmission timing adjusting unit adjusts the transmission timing of the on-vehicle wireless communication apparatus so as not to fall below the lower limit when the transmission timing adjusting unit temporarily changes the predetermined frequency.

3. The on-vehicle wireless communication apparatus according to claim 1,
wherein the transmission timing adjusting unit does not adjust the transmission timing of the on-vehicle wireless communication apparatus when the another vehicle is not located immediately in front of the vehicle.

4. A communication system comprising a plurality of on-vehicle wireless communication apparatuses,
wherein each on-vehicle wireless communication apparatus is defined according to claim 1, and
wherein each on-vehicle wireless communication apparatus is mounted on a respective vehicle.

5. An on-vehicle wireless communication apparatus mounted on a vehicle for transmitting transmission data wirelessly at a predetermined frequency, the transmission data including at least positional information of the vehicle, the apparatus comprising:
a receiver that sequentially receives the transmission data transmitted from another on-vehicle wireless communication apparatus mounted on another vehicle;
a positional information acquiring unit that sequentially acquires the positional information of the vehicle;
a location specifying unit that specifies a location relationship between the vehicle and the another vehicle based on the positional information of the vehicle acquired by the positional information acquiring unit and the positional information of the another vehicle received by the receiver;
an another-apparatus transmission timing specifying unit that specifies a transmission timing of the transmission data in the another on-vehicle wireless communication apparatus when the another vehicle is located immediately in front of the vehicle; and
a transmission timing adjusting unit that adjusts a transmission timing of the transmission data to be transmitted from the on-vehicle wireless communication apparatus so that the transmission data is transmitted at the predetermined frequency with an adjusted transmission timing of the on-vehicle wireless communication apparatus, which is later by a predetermined time than the transmission timing of the another on-vehicle wireless communication apparatus; wherein
the transmission data further includes at least travel direction information of the vehicle in addition to the positional information of the vehicle,
the on-vehicle wireless communication apparatus further comprising:
a travel direction information acquiring unit that sequentially acquires the travel direction information of the vehicle,
wherein the location specifying unit specifies the location relationship between the vehicle and the another vehicle disposed in a travel direction of the vehicle based on the positional information of the vehicle, the travel direction information of the vehicle acquired by the travel direction information acquiring unit, and the positional information and the travel direction information of the another vehicle received by the receiver, and
wherein the other-apparatus transmission timing specifying unit specifies the transmission timing of the another on-vehicle wireless communication apparatus when the another vehicle having a travel direction equal to the travel direction of the vehicle is located immediately in front of the vehicle.

6. The on-vehicle wireless communication apparatus according to claim 5,
wherein the transmission data to be transmitted from the on-vehicle wireless communication apparatus further includes the transmission data of the another on-vehicle wireless communication apparatus received by the receiver.

7. The on-vehicle wireless communication apparatus according to claim 6 further comprising:
an important information acquiring unit that acquires important information, which affects a travel condition of other vehicles disposed around the vehicle,
wherein, when the important information acquiring unit acquires the important information, the transmission data to be transmitted from the on-vehicle wireless communication apparatus further includes the important information of the vehicle, and wherein, when the another vehicle having the travel direction equal to the travel direction of the vehicle is located immediately in front of the vehicle, and the transmission data of the another on-vehicle wireless communication apparatus includes important information, the transmission data to be transmitted from the on-vehicle wireless communication apparatus further includes the important information of the another on-vehicle wireless communication apparatus.

8. The on-vehicle wireless communication apparatus according to claim 7, wherein the location specifying unit specifies, in the location relationship between the vehicle and the another vehicle disposed in the travel direction of the vehicle, whether the vehicle and the another vehicle are located on a same track, and wherein, when the another vehicle having the travel direction equal to the travel direction of the vehicle is located immediately in front of the vehicle on the same track, and the transmission data of the another on-vehicle wireless communication apparatus includes important information, the transmission data to be transmitted from the on-vehicle wireless communication apparatus further includes the important information of the another on-vehicle wireless communication apparatus.

9. The on-vehicle wireless communication apparatus according to claim 7, wherein the location specifying unit specifies, in the location relationship between the vehicle and the another vehicle disposed in the travel direction of the vehicle, whether the vehicle and the another vehicle are located on a same track, and wherein, when the another vehicle having the travel direction equal to the travel direction of the vehicle is located immediately in front of the vehicle on a track different from a track of the vehicle, and the transmission data of the another on-vehicle wireless communication apparatus includes important information, the transmission data to be transmitted from the on-vehicle wireless communication apparatus further includes the important information of the another on-vehicle wireless communication apparatus.

10. The on-vehicle wireless communication apparatus according to claim 6 further comprising:

an important information acquiring unit that acquires important information, which affects a travel condition of other vehicles disposed around the vehicle, wherein, when the important information acquiring unit acquires the important information, the transmission data to be transmitted from the on-vehicle wireless communication apparatus further includes the important information, wherein the important information has a level, which defines an importance degree, wherein, when the importance degree of the important information received from the another on-vehicle wireless communication apparatus is lower than a predetermined importance degree, the transmission data to be transmitted from the on-vehicle wireless communication apparatus further includes the important information of the another on-vehicle wireless communication apparatus mounted in the another vehicle, which has the travel direction equal to the travel direction of the vehicle and is located in front of the vehicle, and wherein, when the importance degree of the important information received from the another on-vehicle wireless communication apparatus is equal to or higher than the predetermined importance degree, the transmission data to be transmitted from the on-vehicle wireless communication apparatus further includes the important information of the another on-vehicle wireless communication apparatus mounted in the another vehicle, which is located in front of the vehicle.

11. The on-vehicle wireless communication apparatus according to claim 7, wherein the important information includes at least one of information related to a change in behavior of the vehicle, actuation information of a device that is actuated upon detecting contact between the vehicle and an obstacle, and actuation information of a device that is actuated upon detecting a dangerousness of contact between the vehicle and the obstacle.

12. The on-vehicle wireless communication apparatus according to claim 7, wherein, when the transmission data including the important information is transmitted, the important information includes transfer stop condition information that specifies a condition for stopping transfer of the important information.

13. The on-vehicle wireless communication apparatus according to claim 12, wherein the transfer stop condition information specifies a transfer frequency as the condition for stopping the transfer of the important information.

14. The on-vehicle wireless communication apparatus according to claim 12, wherein the transfer stop condition information specifies a distance from a transmission original position, at which an on-vehicle wireless communication apparatus initially transmits the important information, to a current position of the vehicle as the condition for stopping the transfer of the important information.

15. The on-vehicle wireless communication apparatus according to claim 7, wherein, when the transmission data including the important information is transmitted, the transmission data further includes source information that defines a transmission source vehicle of the important information, the on-vehicle wireless communication apparatus further comprising:

a transferred information storage unit that stores the source information of the important information when the important information has been transferred; and a transfer determining unit that determines whether the important information has been already transferred, based on the source information in the transmission data received by the receiver and the source information stored in the transferred information storage unit when the transmission data received by the receiver includes the important information, and wherein, when the transfer determining unit determines that the important information has been already transferred, the important information is not transferred.

* * * * *